United States Patent
Saxena et al.

(10) Patent No.: US 9,654,295 B2
(45) Date of Patent: May 16, 2017

(54) SYSTEM AND METHOD FOR VERIFYING VARIED ELECTRONIC SIGNATURE

(71) Applicant: Infosys Limited, Bangalore (IN)

(72) Inventors: Ashutosh Saxena, Hyderabad (IN); Shikha Gupta, New Delhi (IN); Harigopal K. B. Ponnapalli, Hyderabad (IN)

(73) Assignee: Infosys Limited, Bangalore (IN)

( * ) Notice: Subject to any disclaimer, the term of this patent is extended or adjusted under 35 U.S.C. 154(b) by 85 days.

(21) Appl. No.: 14/845,035

(22) Filed: Sep. 3, 2015

(65) Prior Publication Data
US 2016/0087803 A1    Mar. 24, 2016

(30) Foreign Application Priority Data
Sep. 22, 2014    (IN) .......................... 4593/CHE/2014

(51) Int. Cl.
*H04L 9/32*    (2006.01)

(52) U.S. Cl.
CPC ........ *H04L 9/3247* (2013.01); *H04L 2209/68* (2013.01)

(58) Field of Classification Search
CPC combination set(s) only.
See application file for complete search history.

(56) References Cited

U.S. PATENT DOCUMENTS

| | | | |
|---|---|---|---|
| 6,578,144 B1 * | 6/2003 | Gennaro ................. | H04L 9/302 380/30 |
| 7,917,765 B2 | 3/2011 | Cramb | |
| 8,850,213 B2 * | 9/2014 | Meyer ................... | H04L 9/3252 713/176 |
| 2007/0101140 A1 * | 5/2007 | Rhoads ................. | H04L 9/3252 713/171 |

* cited by examiner

*Primary Examiner* — Fatoumata Traore
(74) *Attorney, Agent, or Firm* — Klarquist Sparkman, LLP

(57) ABSTRACT

The technologies relate to a system and method for electronic signature agnostic verification. The method involves receiving a request to verify an electronic signature, thereafter validating an integrity of the electronic signature on the basis of one or more predefined validation parameters and validation fields, then analyzing the validated electronic signature to obtain one or more features of the validated electronic signature, further decoding the analyzed electronic signature using one or more decode parameters, and finally comparing the decoded electronic signature with a predefined value received from one or more sources, to check the correctness of the decoded electronic signature. The technique supports various electronic signature formats and electronic signature standards.

15 Claims, 3 Drawing Sheets

SYSTEM AND METHOD FOR VERIFYING VARIED ELECTRONIC SIGNATURE

FIELD

The field relates to varied electronic signature agnostic verification, and more particularly, relates a system and method for varied electronic signature verification.

BACKGROUND

Digital signatures are the electronic equivalent of handwritten signatures and use advanced public key cryptographic primitives. Digital signatures address authentication, integrity, and non-repudiation needs of business transactions. The digital signature verification process is a critical and complex process that involves verification of trust relations, data integrity, and authenticity of signers. There are multiple digital signature standard algorithms (ex: RSA, DSA, ECC, etc.) and signature representation formats (ex: PKCS#7, XML Dsig, etc.) present in the public domain. Each of these standards has their own pros and cons and applicability and/or suitability to different business transactions. There are tools and libraries available both commercially and in open source to integrate digital signature support into business transactions. Many popular business document software have built-in support for digital signature creation and verification. However, the major challenge is there are many digital document formats (text, html, gif, jpg, png, etc.) in use which do not have any in-built digital signature support. Also, multiple digital signature format standards are used, and there is no single framework through which all popular digital signature formats can seamlessly be integrated into business transactions. Another important challenge is the popular signature solutions typically support a particular document format (e.g., office, or pdf) and need the business software to convert existing data to be converted into a supported format only to support digital signatures for e.g. a HTML/TEXT/Image data will be converted into Pdf to support digital signatures.

SUMMARY

The described technologies can overcome the limitation mentioned above by providing system and method for varied electronic signature verification which supports various electronic signature formats and standards.

According to a present embodiment, a method for varied electronic signature verification is disclosed. The method involves receiving a request to verify an electronic signature, thereafter an integrity of the electronic signature is validated. Then the validated electronic signature is classified into one or more predefined categories. Further, the analyzed electronic signature is decoded based on the obtained validated electronic signature classification by using one or more decode parameters and finally the decoded electronic signature is compared with a predefined value received from one or more sources, to check the correctness of the decoded electronic signature.

In an additional embodiment, a system for varied electronic signature verification is disclosed. The system comprises one or more processors; and one or more memories operatively coupled to at least one of the one or more processors and having instructions stored thereon that, when executed by at least one of the one or more processors, cause at least one of the one or more processors to perform a method as described. The one or more processors receive a request to verify an electronic signature thereafter validate an integrity of the electronic signature on the basis of one or more predefined validation parameters and validation fields. Then the validated electronic signature is classified into one or more predefined categories. Further, it can decode the analyzed electronic signature based on the obtained validated electronic signature classification by using one or more decode parameters. And finally, it can compare the decoded electronic signature with a predefined value received from one or more sources, to check the correctness of the decoded electronic signature.

In another embodiment, a non-transitory computer readable medium for varied electronic signature verification is disclosed. This involves a non-transitory computer readable medium having stored thereon instructions to receive a request to verify an electronic signature thereafter validate an integrity of the electronic signature on the basis of one or more predefined validation parameters and validation fields. Then analyze the validated electronic signature for classifying the validated electronic signature into one or more predefined categories. Further, decode the analyzed electronic signature based on the obtained validated electronic signature classification by using one or more decode parameters. And finally, compare the decoded electronic signature with a predefined value received from one or more sources, to check the correctness of the decoded electronic signature.

DRAWINGS

Various embodiments will, hereinafter, be described in conjunction with the appended drawings provided to illustrate, and not to limit the invention, wherein like designations denote like elements, and in which.

DETAILED DESCRIPTION

Figure 1:
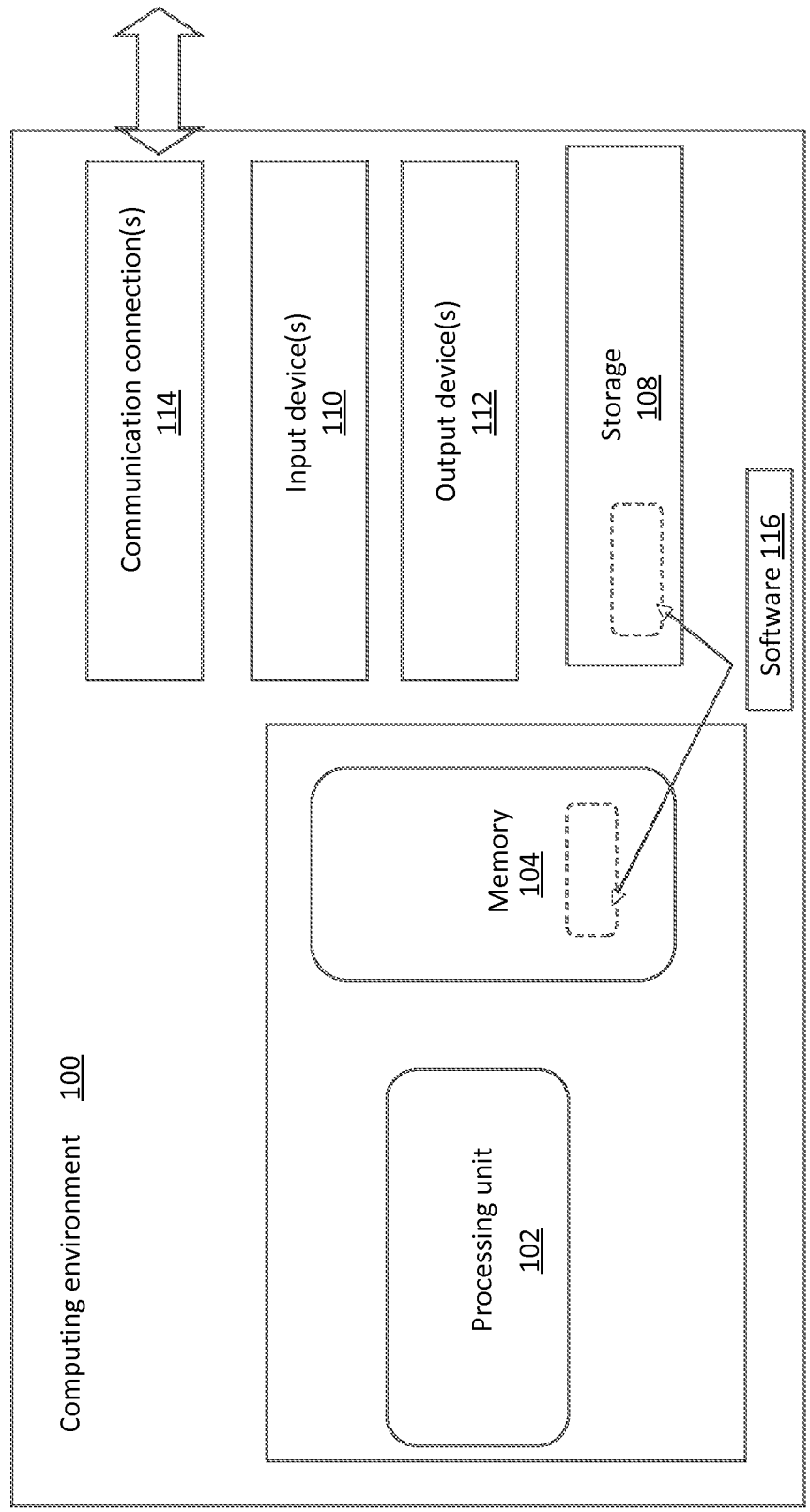
FIG. 1 is a computer architecture diagram illustrating a computing system capable of implementing the embodiments presented herein.

The foregoing has broadly outlined the features and technical advantages of the present disclosure in order that the detailed description of the disclosure that follows may be better understood.

Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The electronic signatures are symbols or other data in digital form attached to an electronically transmitted document as confirmation of the sender's intent to sign the document. The electronic signature is varied (Also, referred as "agnostic") as it may include but not limited to text, html, gif, jpg, png, fingerprints, palm veins, face recognition, palm print, hand geometry, iris recognition, retina or any other related biometric data etc. The varied electronic signature or electronic signature agnostic refers to electronic signature of any electronic signature format, verified without need of converting it to compatible format also. It supports signature of various standard signature algorithm (ex: RSA, DSA, ECC, etc.) with a provision to upgrade. The electronic signature may be single electronic signature or group electronic signature or multi party electronic signature or partial electronic signature, or any such similar electronic signature. The single party electronic signature refers to an electronic signature belonging to a single party which needs verification. The group electronic signature refers to a group of electronic signatures which need verification. The multi-party electronic signature refers to electronic signature from more than one party. The partial electronic signature refers to some electronic signatures among many electronic signatures, hence in case of partial signature verification some electronic signatures are verified among many signatures. The group or multi-party or partial electronic signature may be in one or more different electronic signature formats and may belong to different electronic signature standard. The verification of such signatures are carried out either sequentially or in parallel.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, mini-computers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
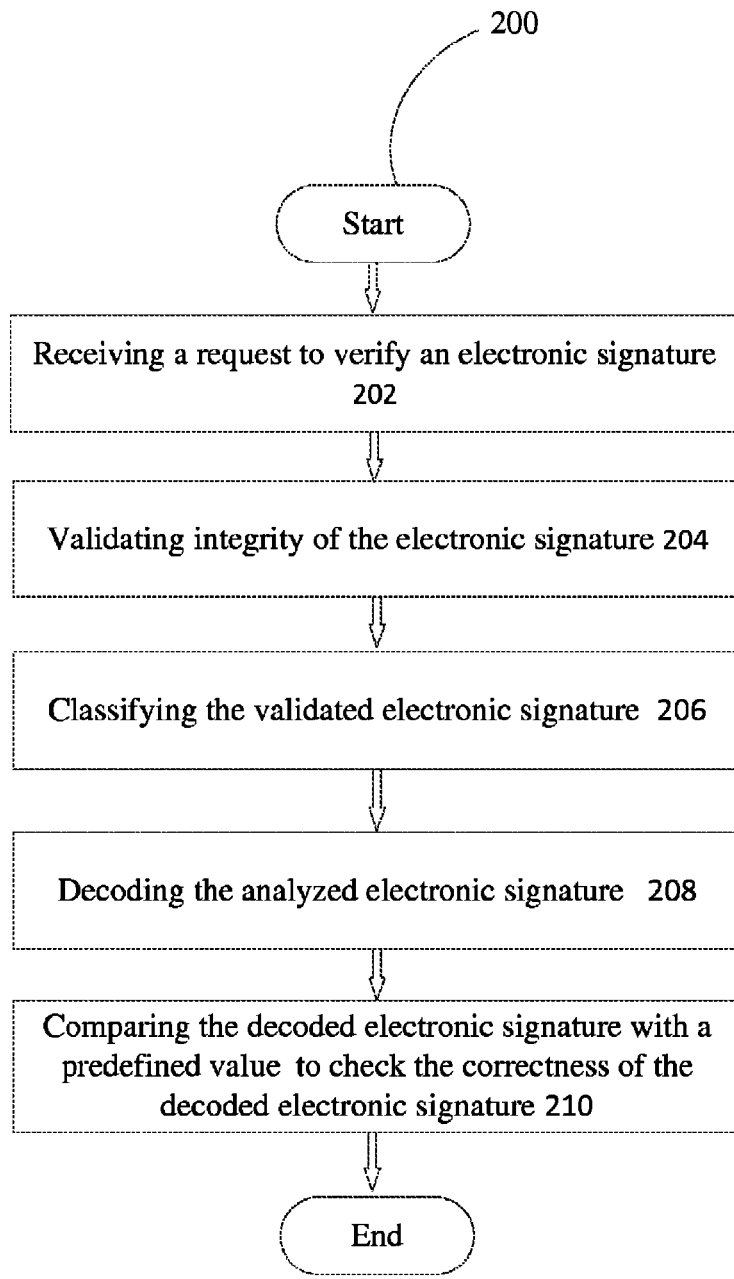
FIG. 2 is a flowchart, illustrating a method for varied electronic signature verification, in accordance with an embodiment of the present invention.

FIG. 2 is a flowchart, illustrating a preferred embodiment of a method for varied electronic signature verification 200.

In a preferred embodiment, the method for varied electronic signature verification involves receiving a request to verify an electronic signature at step 202. The request is received, from any external or internal source which may include but is not limited to client or third party or any interested party. Once the request to verify the electronic signature is received, an integrity of the electronic signature is validated based on one or more predefined validation parameters and validation fields, at step 204. The integrity of the electronic signature refers to accuracy and consistency of the electronic signature. The integrity is validated through one or more predefined parameters and validation fields. The electronic and/or digital signature present in public domain uses a particular standard algorithm (for E.g. RSA, DSA, ECC, etc.) and a particular signature representation formats (e.g., PKCS#7, XML Dsig, etc.) which usually comprises various standard enlisted parameters for standard verification of the electronic signatures. These parameters are present in the standard algorithm which is being used for electronic and/or digital signature creation. The standard verification is a standard verification process present in the electronic or digital signature standards algorithm. The predefined parameters refers to the validating the presence of a particular standard parameters in standard algorithm used for the electronic signature creation based on the type of signature, for example, for creation of an XML electronic signature the various parameters required for validating the electronic signature is checked for its integrity in accordance with a set of signature metadata.

XML digital Signature Metadata:

```
<Signature ID?>
        <SignedInfo>
                <CanonicalizationMethod/>
                <SignatureMethod/>
                (<Reference URI? >
                        (<Transforms>)?
                        <DigestMethod>
                        <DigestValue>
                </Reference>)+
        </SignedInfo>
        <SignatureValue>
    (<KeyInfo>)?
    (<Object ID?>)*
</Signature>
```

(where "?" denotes zero or one occurrence; "+" denotes one or more occurrences; and "*" denotes zero or more occurrences)

In above example a Signature, a SignedInfo, a CanonicalizationMethod, a SignatureMethod, a Reference, a Digest Method, a DigestValue, a SignatureValue are minimally required parameters to attempt signature standard verification as per the standard.

The parameters differ from type of signature such as for biometric signature, the validation parameters are different hence based on the type of signature, predefined parameters are chosen in accordance with the set of signature metadata. The set of signature metadata comprises information about particular type of signature. This set of signature metadata is upgradable as per the type of signature by a metadata source pertaining to signature metadata.

The validation process also involves validation of the electronic signature on the basis of one or more validation fields. The validation fields are upgradable by a metadata source pertaining to validation fields. It comprises a set of characteristics of the electronic signature which are configurable. According to an exemplary embodiment some of validation fields are, but are not limited to, validating of certificate of the electronic signature for its expiry, validating of certificate status such as revoked or not, validating of a key size, validating of a predefined value etc. The method also involves ending the validation process and presenting a negative result in a case wherein the validation of the integrity of the electronic signature on the basis of one or more predefined parameters and fields fails and the method is not taken to further step of varied electronic signature verification. According to an exemplary embodiment of the invention, in a case wherein the validation parameter required for the validation are not present and also the electronic signature is expired in such case the validation process is ended and negative validation result is presented and the method is not taken further for the varied electronic signature verification.

Once the electronic signature is validated for its integrity on the basis on one or more predefined parameters and validation fields, a validated electronic signature is obtained.

Thereafter, at step 206, the validated electronic signature are analyzed for classifying the validated electronic signature into one or more predefined categories. The analysis of validated electronic signature involves mapping of the validated electronic signature with the set of signature metadata, for example: an xml biometric signature is mapped to a signature metadata of an xml biometric signature standard. In one embodiment, the set of signature metadata is upgradable from a signature metadata source. After mapping of the electronic signature, the mapped electronic signature so obtained is subjected to an extraction from which a set of information about electronic signature is obtained. According to an exemplary embodiment of the invention the set of information are information about the electronic signature which may include but is not limited to key, Encoding algorithm, Hash value, Hash algorithm, Signature etc. Finally, the set of information obtained is classified into the one or more predefined categories. According to an exemplary embodiment of the invention the one or more predefined categories may include but is not limited to decode key, hash data, signature type etc. The one or more categories are defined on the basis of various factors such as signature type, hash value etc.

According to an embodiment of the invention the analyzed signature is decoded based on the obtained validated electronic signature classification by using one or more decode parameters at step 208. The decode parameters are parameters require to decode the analyzed signature. According to another exemplary embodiment, the one or more decode parameters may include but is not limited to decode key. A decode key is used to decode the electronic signature. A key is a piece of information (a parameter) that determines a functional output of a cryptographic algorithm or cipher.

According to further embodiment of the invention, once the electronic signature is decoded, it is compared with a predefined value or digest value received from one or more sources to check the correctness of the decoded electronic signature at step 210. The predefined value may be received from any external or internal source which may include but is not limited to client or third party or any interested party. The digest value or predefined value is an original or reference value used for comparison which is compared with the decoded electronic signature. If the comparison result shows matching of a comparison value, a successful verification is reported. If comparison value is not same then an unsuccessful verification is reported.

According to yet another embodiment of the invention, the method also involves controlling the method for varied electronic signature verification from one or more interfaces. The one or more interfaces is not limited to Motion tracking interfaces, Multi-screen interfaces, Non-command user interfaces, Tangible User Interfaces, Text-based user interfaces, Voice user interfaces, Zero-Input interfaces, touchscreen interfaces etc.

Figure 3:
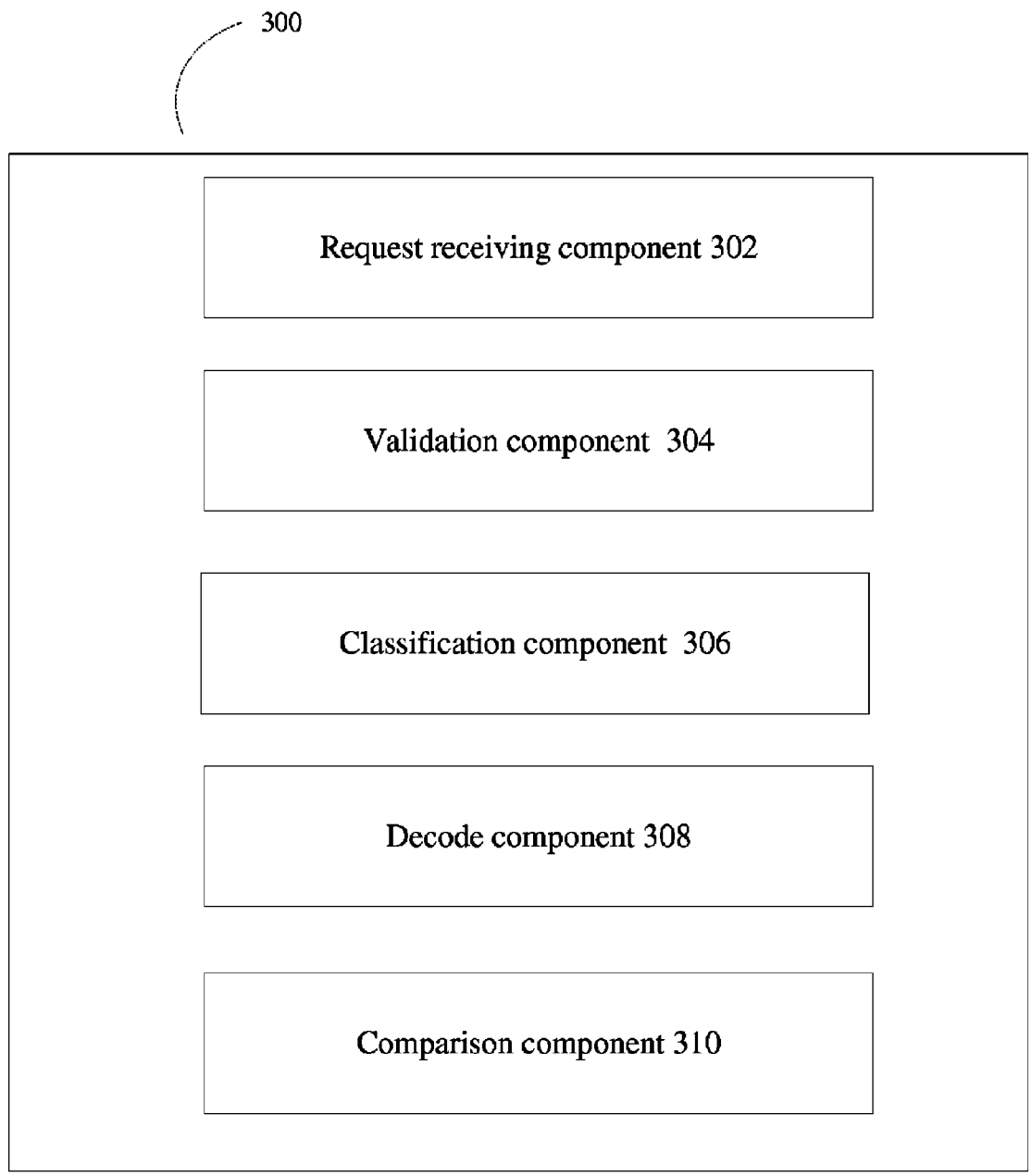
FIG. 3 is a block diagram illustrating a system for varied electronic signature verification, in accordance with an embodiment of the present invention.

FIG. 3 is a block diagram illustrating a system for varied electronic signature verification 300, in accordance with an embodiment of the present invention. The system includes a request receiving component 302, a validation component 304, an analysis component 306, a decode component 308 and a comparison component 310. All these components resides in memory 104. The request receiving component is configured to receive a request to verify an electronic signature. The validation component is configured to validate an integrity of the electronic signature on the basis of one or more predefined validation parameters and validation fields. The analysis component is configured to analyze the validated electronic signature for classifying the validated electronic signature into one or more predefined categories to obtain one or more features of the validated electronic signature. The decode component is configured to decode the analyzed electronic signature based on the obtained validated electronic signature classification by using one or more decode parameters. The comparison component is configured to compare the decoded electronic signature with a predefined value received from one or more sources, to check the correctness of the decoded electronic signature. The analyzing component further involves a mapping component configured to map the validated electronic signature with a set of signature metadata, an extraction component configured to extract a set of information from the mapped electronic signature and a classification component configured to classify the extracted electronic signature information into one or more predefined categories.

The system further involves a process ending component configured to end the validation process and present a negative result on the presentation component in a case wherein the validating the integrity of the electronic signature on the basis of one or more predefined parameters and fields fails.

The system further comprises an external interface control component configured to control the step of varied electronic signature verification from one or more external interfaces.

The system also has an upgrade component configured to upgrade the predefined parameters, validation fields and the signature metadata from one or more applicable metadata sources.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A computer-implemented method executed by one or more computing devices for verification of varied electronic signature comprising:
receiving, by at least one of the one or more computing devices, a request to verify an electronic signature;
on receiving the request, validating, by at least one of the one or more computing devices, an integrity of the electronic signature on the basis of one or more predefined validation parameters and validation fields;
classifying, using at least one of the one or more computing devices, the validated electronic signature into one or more predefined categories;
decoding, by at least one of the one or more computing devices, the electronic signature based on the one or more predefined categories; and
comparing, by at least one of the one or more computing devices, the decoded electronic signature with a predefined value received from one or more sources to check the correctness of the decoded electronic signature;
wherein the classifying the validated electronic signature comprises:
mapping, by at least one of the one or more computing devices, the validated electronic signature with a set of signature metadata;
extracting, by at least one of the one or more computing devices, a set of information from the mapped electronic signature; and
classifying, by at least one of the one or more computing devices, the extracted electronic signature information into the one or more predefined categories.

2. The method as claimed in claim 1, wherein the electronic signature is a single electronic signature, a group electronic signature, a multi-party electronic signature or a partial electronic signature.

3. The method as claimed in claim 1, further comprising:
providing a negative validation result in a case wherein the step of validating integrity of the electronic signature on the basis of the one or more predefined parameters and fields fails, and
terminating, by at least one or more computing device, the method of verification of varied electronic signature.

4. The method as claimed in claim 1, wherein the varied electronic signature verification is controlled from one or more external interfaces.

5. The method as claimed in claim 1, further comprising upgrading, by at least one of the one or more computing devices, the one or more predefined validation parameters, validation fields and the signature metadata from one or more applicable metadata sources.

6. A system for verification of varied electronic signature comprising:
one or more processors; and
one or more memories operatively coupled to at least one of the one or more processors and having instructions stored thereon that, when executed by at least one of the one or more processors, cause at least one of the one or more processors to:
receive a request to verify an electronic signature;
validate an integrity of the electronic signature on the basis of one or more predefined validation parameters and validation fields;
classify the validated electronic signature for classifying the validated electronic signature into one or more predefined categories;
decode the analyzed electronic signature based on the one or more predefined categories; and
compare the decoded electronic signature with a predefined value received from one or more sources, to check the correctness of the decoded electronic signature;
wherein the classifying further comprises:
mapping the validated electronic signature with a set of signature metadata;
extracting a set of information from the mapped electronic signature; and
classifying the extracted electronic signature information into the one or more predefined categories.

7. The system as claimed in claim 6, wherein the electronic signature is a single electronic signature or a group electronic signature or a multi-party electronic signature or a partial electronic signature.

8. The system as claimed in claim 6, wherein the instructions further cause at least one of the one or more processors to:
provide a negative result in a case wherein the validating the integrity of the electronic signature on the basis of one or more predefined parameters and fields fails; and
terminate verification of varied electronic signature.

9. The system as claimed in claim 6, wherein the varied electronic signature verification is controlled from one or more external interfaces.

10. The system as claimed in claim 6, wherein the instructions further cause at least one of the one or more processors to:
upgrade the one or more predefined validation parameters, validation fields and the signature metadata, from one or more applicable metadata sources.

11. At least one non-transitory computer-readable medium storing computer-readable instructions that, when executed by one or more computing devices, cause at least one of the one or more computing devices to perform a method comprising:
receiving a request to verify an electronic signature;
validating an integrity of the electronic signature on the basis of one or more predefined validation parameters and validation fields;
classifying the validated electronic signature for classifying the validated electronic signature into one or more predefined categories;
decoding the analyzed electronic signature based on the one or more predefined categories; and
comparing the decoded electronic signature with a predefined value received from one or more sources, to check the correctness of the decoded electronic signature;
wherein classifying the validated electronic signature comprises:
mapping the validated electronic signature with a set of signature metadata;
extracting a set of information from the mapped electronic signature; and
classifying the extracted electronic signature information into the one or more predefined categories.

12. The at least one non-transitory computer-readable medium of claim 11, wherein the electronic signature is a single electronic signature or a group electronic signature or a multi-party electronic signature or a partial electronic signature.

13. The at least one non-transitory computer-readable medium of claim 11, wherein the method further comprises:
    providing a negative result on the presentation component in a case wherein the validating the integrity of the electronic signature on the basis of one or more predefined parameters and fields fails; and
    terminating verification of varied electronic signature.

14. The at least one non-transitory computer-readable medium of claim 11, wherein varied electronic signature verification is controlled from one or more external interfaces.

15. The at least one non-transitory computer-readable medium of claim 11, wherein the method further comprises:
    upgrading the one or more predefined validation parameters, validation fields and the signature metadata, from one or more applicable metadata sources.

* * * * *